(12) United States Patent
Kaushik et al.

(10) Patent No.: US 11,507,491 B2
(45) Date of Patent: Nov. 22, 2022

(54) SYSTEM FOR CONTROLLING DATA FLOW BETWEEN MULTIPLE PROCESSORS

(71) Applicant: NXP USA, Inc., Austin, TX (US)

(72) Inventors: Arvind Kaushik, Noida (IN); Amrit Pal Singh, Ludhiana (IN); Puneet Khandelwal, Noida (IN)

(73) Assignee: NXP USA, Inc., Austin, TX (US)

(*) Notice: Subject to any disclaimer, the term of this patent is extended or adjusted under 35 U.S.C. 154(b) by 239 days.

(21) Appl. No.: 17/033,366

(22) Filed: Sep. 25, 2020

(65) Prior Publication Data

US 2022/0100633 A1 Mar. 31, 2022

(51) Int. Cl.
*G06F 11/34* (2006.01)
*H04L 43/024* (2022.01)
*G06F 9/52* (2006.01)

(52) U.S. Cl.
CPC .......... *G06F 11/3466* (2013.01); *G06F 9/526* (2013.01); *H04L 43/024* (2013.01); *G06F 2201/88* (2013.01)

(58) Field of Classification Search
CPC .... G06F 15/00; G06F 11/0724; G06F 11/076; G06F 11/3466; G06F 2201/88; G06F 9/526; H04L 43/024

USPC ........................................................ 702/186
See application file for complete search history.

(56) References Cited

U.S. PATENT DOCUMENTS 7,143,410 B1 11/2006 Coffman et al.
7,574,320 B2 * 8/2009 Corwin .................. G08C 17/00
                                                    702/127

* cited by examiner

*Primary Examiner* — John H Le (57) ABSTRACT

First and second processors that are in communication with each other are disclosed. The first processor includes a sampling controller, a sampling circuit, and a data flow controller. The sampling controller is configured to receive multiple identifiers and corresponding enable signals associated with data that is to be transmitted to or received from the second processor, and generate an identification signal and a sampling signal based on one of the identifiers and the corresponding enable signal. The sampling circuit is configured to sample multiple data counts to generate corresponding sampled counts based on the identification signal and the sampling signal. The data flow controller is configured to generate a control signal based on the identifiers, the corresponding enable signals, the data counts, and the corresponding sampled counts to control data flow between the first and second processors.

20 Claims, 3 Drawing Sheets

SYSTEM FOR CONTROLLING DATA FLOW BETWEEN MULTIPLE PROCESSORS

BACKGROUND

The present disclosure relates generally to electronic circuits, and, more particularly, to a system for controlling data flow between multiple processors.

Communication systems are extensively utilized for facilitating communication between two or more circuits or devices. The communication between such circuits or devices may be wired or wireless. One example of such communication is data transfer between two processors, such as a physical layer (PHY) processor and a media access control layer (MAC) processor of a wireless local area network (WLAN). The MAC processor transmits or receives data to or from the PHY processor, respectively. In applications such as automotive or network applications, the data includes a significant number of data packets that are transferred between the two processors. Thus, it is required to control data flow in such a way that that the two processors are able to operate independently, and the data is transferred between the two processors in entirety and in a synchronized manner. In a conventional communication system, if transfer of a new data packet is initiated between the two processors before the completion of a previous data transfer, the processor that is receiving the data discards a portion of the new data packet considering an overflow condition for the previous data transfer. Thus, the portion of the new data packet is lost.

A known solution for the aforementioned problem is to initiate the transfer of the new data packet upon receiving, from the processor that is receiving the data, an acknowledgement that is indicative of the completion of the previous data transfer, thereby avoiding data loss. However, implementing the aforementioned solution for transfer of the data having a significant number of data packets requires execution of additional instructions to synchronize the data transfer. As a result, a time taken by and a design complexity of the communication system significantly increases, which in turn significantly reduces an efficiency of the communication system for the data transfer between the two processors. Thus, there is a need for a technical solution that solves the aforementioned problems of conventional communication systems that control data flow between multiple processors.

SUMMARY

In one embodiment, a first processor in communication with a second processor is disclosed. The first processor comprises a sampling controller, a sampling circuit, and a data flow controller. The sampling controller is configured to receive, from the second processor, a first identifier associated with first data that is to be transmitted to the second processor. The sampling controller is further configured to receive a first enable signal associated with the first data, and generate an identification signal and a sampling signal based on the first identifier and the first enable signal. The sampling circuit is coupled with the sampling controller, and configured to receive the identification signal, the sampling signal, and a first data count associated with the first data. The sampling circuit is further configured to sample, based on the identification signal and the sampling signal, the first data count to generate a first sampled count. The data flow controller is coupled with the sampling circuit, and configured to receive the first identifier, the first data count, the first enable signal, and the first sampled count, and generate a control signal to control data flow of the first data from the first processor to the second processor.

In another embodiment, a first processor in communication with a second processor is disclosed. The first processor comprises a sampling controller, a sampling circuit, and a data flow controller. The sampling controller is configured to receive, from the second processor, a first identifier associated with first data that is to be received from the second processor. The sampling controller is further configured to receive a first enable signal associated with the first data, and generate an identification signal and a sampling signal based on the first identifier and the first enable signal. The sampling circuit is coupled with the sampling controller, and configured to receive the identification signal, the sampling signal, and a first data count associated with the first data. The sampling circuit is further configured to sample, based on the identification signal and the sampling signal, the first data count to generate a first sampled count. The data flow controller is coupled with the sampling circuit, and configured to receive the first identifier, the first data count, the first enable signal, and the first sampled count, and generate a control signal to control data flow of the first data from the second processor to the first processor.

In yet another embodiment, a first processor in communication with a second processor is disclosed. The first processor comprises a transmitter and a receiver. The transmitter includes a first sampling controller, a first sampling circuit, and a first data flow controller. The first sampling controller is configured to receive, from the second processor, a first identifier associated with first data that is to be transmitted to the second processor. The first sampling controller is further configured to receive a first enable signal associated with the first data and generate a first identification signal and a first sampling signal based on the first identifier and the first enable signal. The first sampling circuit is coupled with the first sampling controller, and configured to receive the first identification signal, the first sampling signal, and a first data count associated with the first data. The first sampling circuit is further configured to sample, based on the first identification signal and the first sampling signal, the first data count to generate a first sampled count. The first data flow controller is coupled with the first sampling circuit, and configured to receive the first identifier, the first data count, the first enable signal, and the first sampled count, and generate a first control signal to control data flow of the first data from the first processor to the second processor. The receiver includes a second sampling controller, a second sampling circuit, and a second data flow controller. The second sampling controller is configured to receive, from the second processor, a second identifier associated with second data that is to be received from the second processor. The second sampling controller is further configured to receive a second enable signal associated with the first data, and generate a second identification signal and a second sampling signal based on the second identifier and the second enable signal. The second sampling circuit is coupled with the second sampling controller, and configured to receive the second identification signal, the second sampling signal, and a second data count associated with the second data. The second sampling circuit is further configured to sample, based on the second identification signal and the second sampling signal, the second data count to generate a second sampled count. The second data flow controller is coupled with the second sampling circuit, and configured to receive the second identifier, the second data count, the second enable signal, and the second sampled count, and generate a second control signal to control data flow of the second data from the second processor to the first processor.

In some examples, the first processor further comprises a first multiplexer. The first multiplexer has a select terminal coupled with the data flow controller, and configured to receive the control signal, and first and second input terminals configured to receive the first data and default data, respectively. The first multiplexer further has an output terminal coupled with the second processor, and configured to output and provide, based on the control signal, one of the first data and default data as read data to the second processor. When the control signal is deactivated, the first data is outputted and provided to the second processor as the read data, and when the control signal is activated, the default data is outputted and provided to the second processor as the read data. An activated state of the control signal is indicative of an underrun event. The data flow controller is further coupled with the second processor, and further configured to provide the control signal to the second processor.

In some examples, the first processor further comprises a memory that is configured to store the first data. The memory is coupled with the first input terminal of the first multiplexer, and further configured to provide the first data to the first input terminal of the first multiplexer.

In some examples, when the data flow controller receives the first identifier and the first enable signal is deactivated, the data flow controller is further configured to stall the data flow of the first data from the first processor to the second processor.

In some examples, the first processor further comprises a core that is coupled with the second processor, and configured to receive configuration information associated with the first data and generate a count select signal and the first enable signal. The first enable signal is activated when the configuration information associated with the first data is received, and deactivated when the first data is transmitted to the second processor. The configuration information includes at least a length of the first data and a second data count associated with the first data.

In some examples, the first processor further comprises a second multiplexer. The second multiplexer has a select terminal coupled with the core, and configured to receive the count select signal, and first and second input terminals coupled with the core and the second processor, and configured to receive the second data count and a third data count associated with the first data, respectively. The second multiplexer further has an output terminal coupled with the sampling circuit, and configured to output and provide, based on the count select signal, one of the second and third data counts as the first data count to the sampling circuit.

In some examples, the first processor further comprises a first register that is coupled with the sampling circuit, and configured to receive and store the first sampled count.

In some examples, the sampling controller is further configured to receive, from the second processor after the first identifier is received, a second identifier associated with second data that is to be transmitted to the second processor after the first data is transmitted. The sampling controller is further configured to receive a second enable signal associated with the second data. The sampling controller generates the identification signal and the sampling signal based on the second identifier and the second enable signal. The sampling circuit is further configured to receive a fourth data count associated with the second data, and sample, based on the identification signal and the sampling signal, the fourth data count to generate a second sampled count. Further, the data flow controller is further configured to receive the second identifier, the fourth data count, the second enable signal, and the second sampled count, and the data flow controller generates the control signal to control data flow of the second data from the first processor to the second processor based on the second identifier, the fourth data count, the second enable signal, and the second sampled count. Furthermore, when the data flow controller receives the second identifier and the second enable signal is deactivated, the data flow controller is further configured to stall the data flow of the second data from the first processor to the second processor.

In some examples, the first processor further comprises a second register and a third multiplexer. The second register is coupled with the sampling circuit, and configured to receive and store the second sampled count. The third multiplexer has a select terminal coupled with the second processor, and configured to receive one of the first and second identifiers, and first and second input terminals coupled with the first and second registers, and configured to receive the first and second sampled counts, respectively. The third multiplexer further has an output terminal coupled with the data flow controller, and configured to output and provide one of the first and second sampled counts to the data flow controller. When the select terminal of the third multiplexer receives the first identifier, the output terminal of the third multiplexer outputs and provides the first sampled count to the data flow controller, and when the select terminal of the third multiplexer receives the second identifier, the output terminal of the third multiplexer outputs and provides the second sampled count to the data flow controller.

Various embodiments of the present disclosure disclose a first processor in communication with a second processor. The first processor includes a sampling controller, a sampling circuit, and a data flow controller. The sampling controller is configured to receive multiple identifiers and corresponding enable signals associated with data that is to be transmitted to or received from the second processor, and generate an identification signal and a sampling signal based on one of the identifiers and the corresponding enable signal. The sampling circuit is configured to sample, based on the identification signal and the sampling signal, multiple data counts to generate corresponding sampled counts. The data flow controller is configured to generate a control signal based on the identifiers, the corresponding enable signals, the data counts, and the corresponding sampled counts to control data flow between the first and second processors. An activated state of the control signal indicates, to the second processor, an underrun or overrun event that occurs when a data count requested by the first processor is greater than a length of the data to be received or transmitted.

The data flow controller is further configured to provide the control signal to the second processor. The second processor thus receives an indication for the underrun or overrun event, and hence, data loss is avoided. The generation of the control signal based on the identifiers and the enable signals ensures that the data flow between the first and second processors is synchronized. Thus, the utilization of the control signal to control the data flow eliminates a need for an acknowledgement that indicates completion of the data transfer between the first and second processor as well as a need for the second processor to wait for the acknowledgement. As a result, the first and second processors are enabled to operate independently, and a time taken for the data transfer between the first and second processors in the communication system of the present disclosure is significantly less as compared to that in a conventional communication system that utilizes additional instructions to synchronize the data transfer. Further, as the first and second processors are able to operate independently and the time required for the data transfer is significantly reduced, an efficiency of the communication system of the present disclosure is significantly higher than that of the conventional communication system.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
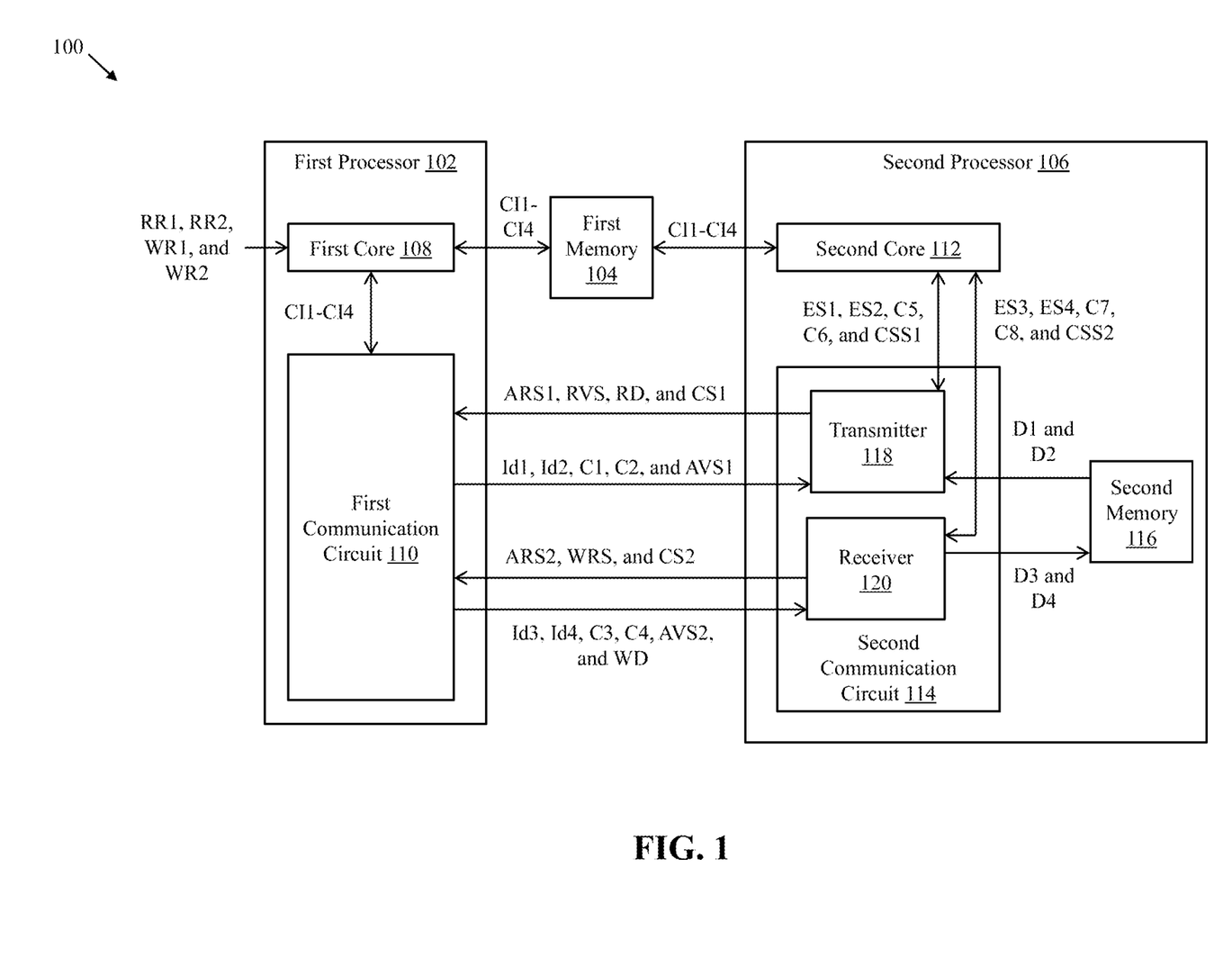
FIG. 1 is a block diagram of a communication system in accordance with an embodiment of the present disclosure.

FIG. 1 is a block diagram of a communication system 100 in accordance with an embodiment of the present disclosure. The communication system 100 may be a single user or a multi-user communication system, and may be utilized in automotive applications (such as an advanced driver assistance system, a vehicle-to-vehicle communication system, or the like) or network applications (such as an 802.11 wireless local area network (WLAN) technology standard, a fifth-generation technology standard, or the like). The communication system 100 includes a first processor 102, a first memory 104, and a second processor 106. Further, the communication system 100 may include a set of user devices (not shown) that is configured to generate a set of read and write requests of which first and second read requests RR1 and RR2 and first and second write requests WR1 and WR2 are shown.

The set of user devices are further configured to provide the set of read and write requests to the first processor 102 for initiating data transfer associated with the first processor 102. For example, the set of user devices are further configured to provide the first and second read requests RR1 and RR2 to the first processor 102 to indicate the first processor 102 to read first and second data. D1 and D2 from the second processor 106, respectively. Similarly, the set of user devices are further configured to provide the first and second write requests WR1 and WR2 to the first processor 102 to indicate the first processor 102 to write third and fourth data D3 and D4 to the second processor 106, respectively. The data that is received or transmitted corresponds to a physical layer conformance procedure (PLCP) protocol data unit (PPDU).

In one example, when the communication system 100 is utilized in a WLAN, the communication system 100 is implemented based on Institute of Electrical and Electronics Engineers (IEEE) 802.11 protocol.

The first processor 102 is a physical layer (PHY) processor of the WLAN. The first processor 102 is wirelessly coupled with the set of user devices, and configured to receive the set of read and write requests (i.e., the first and second read requests RR1 and RR2 and the first and second write requests WR1 and WR2). Based on the first and second read requests RR1 and RR2 and the first and second write requests WR1 and WR2, the first processor 102 is further configured to generate first through fourth configuration information CI1-CI4, respectively. The first and second configuration information CI1 and CI2 are associated with reading of the first and second data D1 and D2 from the second processor 106. Similarly, the third and fourth configuration information CI3 and CI4 are associated with writing of the third and fourth data D3 and D4 to the second processor 106. Thus, based on the first through fourth configuration information CI1-CI4, the first processor 102 is further configured to communicate with the second processor 106 to read the first and second data D1 and D2 and write the third and fourth data D3 and D4, respectively. In one example, the first processor 102 communicates (i.e., executes data transfer) with the second processor 106 by utilizing an advance extensible interface (AXI) defined by the AXI4 protocol. The first processor 102 includes a first core 108 and a first communication circuit 110.

The first core 108 is configured to receive the set of read and write requests, and generate multiple configuration information based on the received set of read and write requests. For example, the first core 108 is configured to receive and decode the first and second read requests RR1 and RR2 and the first and second write requests WR1 and WR2. Based on the decoding of the first and second read requests RR1 and RR2 and the first and second write requests WR1 and WR2, the first core 108 is further configured to generate the first through fourth configuration information CI1-CI4, respectively. The first through fourth configuration information CI1-CI4 are thus associated with the first through fourth data D1-D4, respectively. Further, the first through fourth data D1-D4 have first through fourth data counts C1-C4 and first through fourth identifiers Id1-Id4 associated therewith, respectively. Each of the first through fourth configuration information CI1-CI4 includes a length of corresponding data (such as the first through fourth data D1-D4, respectively) a corresponding data count (such as the first through fourth data counts C1-C4, respectively), and a corresponding identifier (such as the first through fourth identifiers Id1-Id4, respectively).

The first communication circuit 110 is coupled with the first core 108, and configured to receive the first through fourth configuration information CI1-CI4. Upon receiving at least one of the first through fourth configuration information CI1-CI4, the first communication circuit 110 is further configured to communicate with the second processor 106. For example, upon receiving the first and second configuration information CI1 and CI2, the first communication circuit 110 is further configured to receive the first and second data. D1 and D2 from the second processor 106, respectively. Similarly, upon receiving the third and fourth configuration information CI3 and CI4, the first communication circuit 110 is further configured to write (i.e., provide) the third and fourth data D3 and D4 to the second processor 106, respectively. In one embodiment, the first communication circuit 110 is configured to operate as a master device of the AXI and the second processor 106 is configured to operate as a slave device of the AXI. Thus, the first communication circuit 110 communicates with the second processor 106 by way of a write address channel (not shown), a write data channel (not shown), a write response channel (not shown), a read address channel (not shown), and a read data channel (not shown) that are defined by the AXI4 protocol.

The first communication circuit 110 is further configured to extract the first and second identifiers Id1 and Id2 and the first and second data counts C1 and C2 from the first and second configuration information CI1 and CI2, respectively. To read at least one of the first and second data D1 and D2 from the second processor 106, the first communication circuit 110 is further configured to generate a first address valid signal AVS1. Further, the first communication circuit 110 is configured to provide at least one of the first and second identifiers Id1 and Id2, at least one of the first and second data counts C1 and C2, and the first address valid signal AVS1 to the second processor 106.

The first communication circuit 110 provides the first identifier Id1, the first data count C1, and the first address valid signal AVS1 to the second processor 106 to initiate reading of the first data D1. Similarly, the first communication circuit 110 provides the second identifier Id2, the second data count C2, and the first address valid signal AVS1 to the second processor 106 to initiate reading of the second data D2. In one example, the first and second identifiers Id1 and Id2 and the first and second data counts C1 and C2 correspond to "ARUSER" signals defined by the AXI4 protocol, and the first address valid signal AVS1 corresponds to an "ARVALID" signal defined by the AXI4 protocol. Further, the first and second identifiers Id1 and Id2, the first and second data counts C1 and C2, and the first address valid signal AVS1 are provided to the second processor 106 over the read address channel. The first address valid signal AVS1 indicates to the second processor 106 that the read address channel is signaling a valid read address.

In response to the first identifier Id1, the first data count C1, and the first address valid signal AVS1, the first communication circuit 110 is further configured to receive a first address ready signal ARS1, a read valid signal RVS, a first control signal CS1, and the first data D1 as read data RD from the second processor 106. Similarly, in response to the second identifier Id2, the second data count C2, and the first address valid signal AVS1, the first communication circuit 110 is further configured to receive the first address ready signal ARS1, the read valid signal RVS, the first control signal CS1, and the second data D2 as the read data RD from the second processor 106. In one example, the first address ready signal ARS1 corresponds to an "ARREADY" signal defined by the AXI4 protocol. The first address ready signal ARS1 is received over the read address channel, and indicates to the first processor 102 that the second processor 106 is available to accept the valid read address. Further, the read valid signal RVS and the read data RD correspond to an "RVALID" signal and "RDATA", respectively, defined by the AXI4 protocol, and are received from the second processor 106 over the read data channel. The read valid signal RVS indicates to the first processor 102 that the read data RD received from the second processor 106 is valid data.

The first control signal CS1 controls data flow from the second processor 106 to the first processor 102. An activated state (i.e., logic high state) of the first control signal CS1 is indicative of an underrun event. The underrun event occurs when a data count (such as the first data count C1) provided by the first communication circuit 110 to the second processor 106 is greater than a length of the data to be received (such as the length of the first data D1) from the second processor 106. In such a scenario, the first communication circuit 110 receives default data DFD (i.e., stream of binary bit '0') as the read data RD until the data count provided by the first communication circuit 110 to the second processor 106 is equal to a length of the read data RD received by the first communication circuit 110 from the second processor 106.

The first communication circuit 110 is further configured to extract the third and fourth identifiers Id3 and Id4 and the third and fourth data counts C3 and C4 from the third and fourth configuration information CI3 and CI4, respectively. To write at least one of the third and fourth data D3 and D4 to the second processor 106, the first communication circuit 110 is further configured to generate a second address valid signal AVS2, and output at least one of the third and fourth data D3 and D4 as write data WD. Further, the first communication circuit 110 is configured to provide at least one of the third and fourth identifiers Id3 and Id4, at least one of the third and fourth data counts C3 and C4, the write data WD, and the second address valid signal AVS2 to the second processor 106.

The first communication circuit 110 provides the third identifier Id3, the third data count C3, the second address valid signal AVS2, and the third data D3 as the write data WD to the second processor 106 for writing the third data D3 thereto. Similarly, the first communication circuit 110 provides the fourth identifier Id4, the fourth data count C4, the second address valid signal AVS2, and the fourth data D4 as the write data WD to the second processor 106 for writing the fourth data D4 thereto. In one example, the third and fourth identifiers Id3 and Id4 and the third and fourth data counts C3 and C4 correspond to "AWUSER" signals defined by the AXI4 protocol. Further, the second address valid signal AVS2 corresponds to an "AWVALID" signal defined by the AXI4 protocol. The third and fourth identifiers Id3 and Id4, the third and fourth data counts C3 and C4, the second address valid signal AVS2 are provided to the second processor 106 over the write address channel. The second address valid signal AVS2 indicates to the second processor 106 that the write address channel is signaling a valid write address. Further, the write data WD corresponds to "WDATA" defined by the AXI4 protocol, and is provided to the second processor 106 over the write data channel.

In response to the third identifier Id3, the third data count C3, and the second address valid signal AVS2, the first communication circuit 110 is further configured to receive a second address ready signal ARS2, a write ready signal WRS, and a second control signal CS2 from the second processor 106. Similarly, in response to the fourth identifier Id4, the fourth data count C4, and the second address valid signal AVS2, the first communication circuit 110 is further configured to receive the second address ready signal ARS2, the write ready signal WRS, and the second control signal CS2 from the second processor 106. In one example, the second address ready signal ARS2 corresponds to an "AWREADY" signal defined by the AXI4 protocol, and is received over the write address channel. The second address ready signal ARS2 indicates to the first processor 102 that the second processor 106 is ready to accept the valid write address. Further, the write ready signal WRS corresponds to a "WREADY" signal defined by the AXI4 protocol, and is received over the write data channel. The write ready signal WRS indicates to the first processor 102 that the second processor 106 is ready to receive the write data WD. The first communication circuit 110 provides at least one of the third and fourth data D3 and D4 to the second processor 106 after the second address ready signal ARS2 and the write ready signal WRS are received by the first communication circuit 110 from the second processor 106.

The second control signal CS2 controls data flow from the first processor 102 to the second processor 106. An activated state (i.e., logic high state) of the second control signal CS2 is indicative of an overrun event. The overrun event occurs when a data count (such as the third data count C3) provided by the first communication circuit 110 to the second processor 106 is greater than a length of the data to be transmitted (such as the length of the third data D3) to the second processor 106. In such a scenario, until a current length of the write data WD received by the second processor 106 is equal to the data count received by the second processor 106, the write data WD is received and written thereto by the second processor 106. After the current length of the write data WD received by the second processor 106 is equal to the data count received by the second processor 106, the write data WD is received and discarded by the second processor 106.

The first memory 104 is a shared memory between the first and second processors 102 and 106. The first memory 104 is coupled with the first core 108, and configured to receive and store the first through fourth configuration information CI1-CI4. Further, the first memory 104 is coupled with the second processor 106, and configured to provide the first through fourth configuration information CI1-CI4 to the second processor 106. Examples of the first memory 104 include, but are not limited to, a dynamic random-access memory (DRAM), a static random-access memory (SRAM), and the like.

The second processor 106 is a media access control layer (MAC) processor of the WLAN. The second processor 106 is coupled with the first processor 102 and the first memory 104, and configured to receive (i.e., retrieve) the first through fourth configuration information CI1-CI4 from the first memory 104. The first and second configuration information CI1 and CI2 indicate the second processor 106 to provide the first and second data D1 and D2 to the first processor 102, respectively. Further, the third and fourth configuration information CI3 and CI4 indicate the second processor 106 to receive the third and fourth data D3 and D4 from the second processor 106, respectively. The second processor 106 includes a second core 112, a second communication circuit 114, and a second memory 116.

The second core 112 is coupled with the first core 108 by way of the first memory 104, and configured to receive the first through fourth configuration information CI1-CI4 associated with the first through fourth data D1-D4, respectively. Upon receiving the first through fourth configuration information CI1-CI4, the second core 112 is further configured to decode the first through fourth configuration information CI1-CI4 and generate fifth through eighth data counts C5-C8 associated with the first through fourth data D1-D4, respectively. The second core 112 is further configured to generate first and second count select signals CSS1 and CSS2 and first through fourth enable signals ES1-ES4. The first and second count select signals CSS1 and CSS2 indicate the second communication circuit 114 to select one data count from a data count received from the first communication circuit 110 (such as the first data count C1) and a data count generated by the second core 112 (such as the fifth data count C5).

The first and second enable signals ES1 and ES2 are activated when the first and second configuration information CI1 and CI2 are received, respectively. The third and fourth enable signals ES3 and ES4 are activated when the third and fourth configuration information CI3 and CI4 are received, respectively. The first and second enable signals ES1 and ES2 are deactivated when the first and second data D1 and D2 are transmitted to the first processor 102, respectively. Further, the third and fourth enable signals ES3 and ES4 are deactivated when the third and fourth data D3 and D4 are received from the first processor 102, respectively. In one embodiment, the second core 112 includes a counter (not shown).

When one of the first through fourth identifiers Id1-Id4 is received, the counter is configured to store the length of the corresponding data as a count value, and decrement the count value on each cycle of the data transfer between the first and second processors 102 and 106. The counter is further configured to generate a count signal (not shown) in an activated state (i.e., at logic high state) when the count value is equal to zero. The activated state of the count signal is indicative of completion of the data transfer. Based on the count signal associated with the data transfer of each of the first through fourth data D1-D4, the second core 112 deactivates the first through fourth enable signals ES1-ES4, respectively.

The second communication circuit 114 is coupled with the second core 112, and configured to receive the first through fourth enable signals ES1-ES4, the fifth through eighth data counts C5-C8, and the first and second count select signals CSS1 and CSS2 from the second core 112. Further, the second communication circuit 114 is coupled with the first communication circuit 110, and configured to receive the first through fourth identifiers Id1-Id4, the first through fourth data counts C1-C4, the first and second address valid signals AVS1 and AVS2, and the third and fourth data D3 and D4 from the first communication circuit 110. Furthermore, the second communication circuit 114 is configured to provide the first and second data D1 and D2, the first and second address ready signals ARS1 and ARS2, the read valid signal RVS, the write ready signal WRS, and the first and second control signals CS1 and CS2 to the first communication circuit 110. The second communication circuit 114 includes a transmitter 118 and a receiver 120. In one embodiment, the first and second communication circuits 110 and 114 are structurally similar. In another embodiment, the first and second communication circuits 110 and 114 are structurally dissimilar.

The transmitter 118 is coupled with the second core 112, and configured to receive the first and second enable signals ES1 and ES2, the fifth and sixth counts C5 and C6, and the first count select signal CSS1. The transmitter 118 is further coupled with the first communication circuit 110, and further configured to receive the first and second identifiers Id1 and Id2, the first and second data counts C1 and C2, and the first address valid signal AVS1. To provide at least one of the first and second data D1 and D2 to the first communication circuit 110, the transmitter 118 is further configured to generate and provide the first address ready signal ARS1, the read valid signal RVS, and the first control signal CS1 to the first communication circuit 110. The transmitter 118 is further coupled with the second memory 116, and configured to retrieve the first and second data D1 and D2 from the second memory 116, and provide the first and second data D1 and D2 to the first communication circuit 110 in response to the reception of the first and second identifiers Id1 and Id2, respectively. The structure and working of the transmitter 118 are explained in detail in conjunction with FIG. 2.

The receiver 120 is coupled with the second core 112, and configured to receive the third and fourth enable signals ES3 and ES4, the seventh and eighth counts C7 and C8, and the second count select signal CSS2. The receiver 120 is further coupled with the first communication circuit 110, and further configured to receive the third and fourth identifiers Id3 and Id4, the third and fourth data counts C3 and C4, and the second address valid signal AVS2. To receive at least one of the third and fourth data D3 and D4 from the first communication circuit 110, the receiver 120 is further configured to generate and provide the second address ready signal ARS2, the write ready signal WRS, and the second control signal CS2 to the first communication circuit 110. The receiver 120 is further configured to receive the third and fourth data D3 and D4 from the first communication circuit 110 in association with the third and fourth identifiers Id3 and Id4, respectively. Further, the receiver 120 is coupled with the second memory 116, and configured to store the third and fourth data D3 and D4 in the second memory 116. The structure and working of the receiver 120 are explained in detail in conjunction with FIG. 3.

The second memory 116 is an internal memory of the second processor 106. The second memory 116 is coupled with the transmitter 118, and configured to the store the first and second data D1 and D2, and provide the first and second data D1 and D2 to the transmitter 118. The second memory 116 is further coupled with the receiver 120, and configured to the receive the third and fourth data D3 and D4 from the receiver 120, and store the third and fourth data D3 and D4. Examples of the second memory 116 include, but are not limited to, a DRAM, an SRAM, and the like.

It will be apparent to a person skilled in the art that although in the current embodiment, the first and second processors 102 and 106 are described as the PHY and MAC processors of the WLAN, the scope of the present disclosure is not limited to it. In an alternate embodiment, the first and second processors 102 and 106 may be any two processors that are utilized in an application that requires data flow therebetween, without deviating from the scope of the present disclosure.

Figure 2:
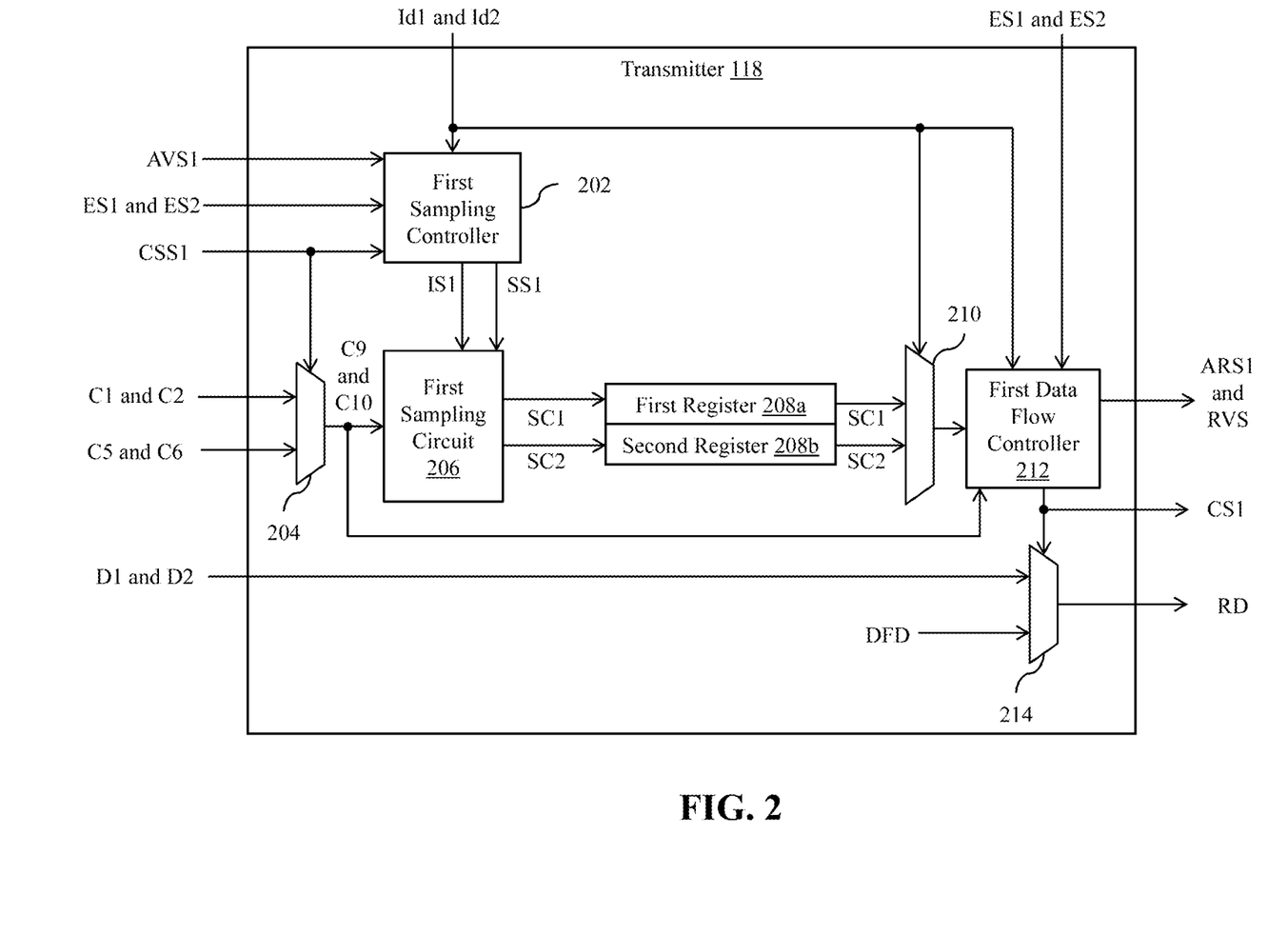
FIG. 2 is a block diagram of a transmitter of the communication system of FIG. 1 in accordance with an embodiment of the present disclosure.

FIG. 2 is a block diagram of the transmitter 118 in accordance with an embodiment of the present disclosure. The transmitter 118 includes a first sampling controller 202, a first multiplexer 204, a first sampling circuit 206, first and second registers 208a and 208b, a second multiplexer 210, a first data flow controller 212, and a third multiplexer 214.

The first sampling controller 202 is coupled with the second core 112, and configured to receive the first and second enable signals ES1 and ES2, the first address valid signal AVS1, and the first count select signal CSS1. The first sampling controller 202 is further coupled with the first communication circuit 110, and configured to receive the first and second identifiers Id1 and Id2 associated with the first and second data D1 and D2 that are to be transmitted to the first communication circuit 110, respectively. The second data D2 is transmitted to the first communication circuit 110 after the first data D1 is transmitted to the first communication circuit 110. The first and second identifiers Id1 and Id2 are received by the first sampling controller 202 sequentially. In one embodiment, the first sampling controller 202 receives the first identifier Id1 before the second identifier Id2.

When the first identifier Id1 is received, the first sampling controller 202 is further configured to generate a first identification signal IS1 and a first sampling signal SS1 based on the first identifier Id1 and the first enable signal ES1. Further, the first sampling controller 202 generates the first identification signal IS1 and the first sampling signal SS1 when the first address valid signal AVS1 is activated (i.e., is at logic high state). Similarly, when the second identifier Id2 is received, the first sampling controller 202 generates the first identification signal IS1 and the first sampling signal SS1 based on the second identifier Id2 and the second enable signal ES2. In one embodiment, the first sampling signal SS1 associated with the first and second identifiers Id1 and Id2 is further generated based on the first count select signal CSS1. When the first count select signal CSS1 is activated (i.e., is at logic high state), the first sampling signal SS1 associated with the first identifier Id1 is generated after the first enable signal ES1 is activated, and the first sampling signal SS1 associated with the second identifier Id2 is generated after the second enable signal ES2 is activated. Further, when the first count select signal CSS1 is deactivated (i.e., is at logic low state), the first sampling signal SS1 associated with the first identifier Id1 is generated after the first enable signal ES1 and the first address valid signal AVS1 are activated, and the first sampling signal SS1 associated with the second identifier Id2 is generated after the second enable signal ES2 and the first address valid signal AVS1 are activated.

The first multiplexer 204 has a select terminal that is coupled with the second core 112, and configured to receive the first count select signal CSS1. The first multiplexer 204 further has first and second input terminals that are coupled with the second core 112 and the first communication circuit 110, respectively, and an output terminal that is coupled with the first sampling circuit 206. When the first identifier Id1 is received, the first and second input terminals of the first multiplexer 204 are configured to receive the fifth data count C5 and the first data count C1, respectively. Further, the output terminal of the first multiplexer 204 is configured to output and provide, based on the first count select signal CSS1, one of the fifth and first data counts C5 and C1 as a ninth data count C9 to the first sampling circuit 206. The first multiplexer 204 outputs the first data count C1 when the first count select signal CSS1 is deactivated (i.e., is at logic low state), and the fifth data count C5 when the first count select signal CSS1 is activated (i.e., is at logic high state). Similarly, when the second identifier Id2 is received, the first and second input terminals of the first multiplexer 204 are configured to receive the sixth data count C6 and the second data count C2, respectively. Further, the output terminal of the first multiplexer 204 is configured to output and provide, based on the first count select signal CSS1, one of the sixth and second data counts C6 and C2 as a tenth data count CI0 to the first sampling circuit 206.

The first sampling circuit 206 is coupled with the first sampling controller 202, and configured to receive the first identification signal IS1 and the first sampling signal SS1 associated with the first and second identifiers Id1 and Id2. The first sampling circuit 206 is further coupled with the output terminal of the first multiplexer 204, and configured to sequentially receive the ninth and tenth data counts C9 and C10 associated with the first and second data D1 and D2, respectively. Further, the first sampling circuit 206 is configured to sample, based on the first identification signal IS1 and the first sampling signal SS1 associated with the first and second identifiers Id1 and Id2, the ninth and tenth data counts C9 and C10 to generate first and second sampled counts SC1 and SC2, respectively. The first sampling circuit 206 includes a first demultiplexer (not shown) and first and second switches (not shown).

The first demultiplexer has an input terminal that is coupled with the output terminal of the first multiplexer 204, and configured to receive one of the ninth and tenth data counts C9 and C10. The first demultiplexer further has a select terminal that is coupled with the first sampling controller 202, and configured to receive the first identification signal IS1. Further, the first demultiplexer has first and second output terminals that are coupled with the first and second switches, respectively. When the first identifier Id1 is received, the first output terminal of the first demultiplexer is further configured to output the ninth data count C9 based on the first identification signal IS1 associated with the first identifier Id1. When the second identifier Id2 is received, the second output terminal of the first demultiplexer is further configured to output the tenth data count C10 based on the first identification signal IS1 associated with the second identifier Id2.

The first and second switches are coupled with the first sampling controller 202, and configured to receive the first sampling signal SS1. Further, the first and second switches are coupled with the first and second output terminals of the first demultiplexer, and configured to receive and sample the ninth and tenth data counts C9 and C10 based on the first sampling signal SS1, respectively. The first and second switches sample the ninth and tenth data counts C9 and C10 to generate the first and second sampled counts SC1 and SC2, respectively. The first switch samples the ninth data count C9 to generate the first sampled count SC1 when the first sampling signal SS1 associated with the first identifier Id1 is activated (i.e., is at logic high state). The first sampling signal SS1 associated with the first identifier Id1 is activated when the first enable signal ES1 is activated (i.e., is at logic high state). Similarly, the second switch samples the tenth data count C10 to generate the second sampled count SC2 when the first sampling signal SS1 associated with the second identifier Id2 is activated (i.e., is at logic high state). The first sampling signal SS1 associated with the second identifier Id2 is activated when the second enable signal ES2 is activated (i.e., is at logic high state).

The first and second registers 208a and 208b are coupled with the first sampling circuit 206, and are configured to receive and store corresponding sampled counts. The first register 208a is coupled with the first switch of the first sampling circuit 206, and configured to receive and store the first sampled count SC1. The second register 208b is coupled with the second switch of the first sampling circuit 206, and configured to receive and store the second sampled count SC2.

It will be apparent to a person skilled in the art that although in the current embodiment, the transmitter 118 includes the first and second registers 208a and 208b that store the first and second sampled counts SC1 and SC2 associated with the first and second data D1 and D2, respectively, the scope of the present disclosure is not limited to it. In an alternate embodiment, the transmitter 118 may include more than two registers that store corresponding sampled counts associated with data to be transmitted to the first processor 102.

The second multiplexer 210 has a select terminal that is coupled with the first communication circuit 110, and configured to receive one of the first and second identifiers Id1 and Id2. The second multiplexer 210 further has first and second input terminals that are coupled with the first and second registers 208a and 208b, and configured to receive the first and second sampled counts SC1 and SC2, respectively. Further, the second multiplexer 210 has an output terminal that is coupled with the first data flow controller 212, and configured to output and provide one of the first and second sampled counts SC1 and SC2 to the first data flow controller 212. When the select terminal of the second multiplexer 210 receives the first identifier Id1, the output terminal of the second multiplexer 210 outputs and provides the first sampled count SC1 to the first data flow controller 212. When the select terminal of the second multiplexer 210 receives the second identifier Id2, the output terminal of the second multiplexer 210 outputs and provides the second sampled count SC2 to the first data flow controller 212.

The first data flow controller 212 is coupled with the first sampling circuit 206 by way of the first and second registers 208a and 208b and the second multiplexer 210, and configured to receive one of the first and second sampled counts SC1 and SC2. The first data flow controller 212 is further coupled with the second core 112, the first multiplexer 204, and the first communication circuit 110, and further configured to receive the first and second enable signals ES1 and ES2, one of the ninth and tenth data counts C9 and C10, and one of the first and second identifiers Id1 and Id2, respectively.

The first identifier Id1, the ninth data count C9, the first enable signal ES1, and the first sampled count SC1 are received in conjunction. When the first data flow controller 212 receives the first identifier Id1 and the first enable signal ES1 is deactivated, the first data flow controller 212 is further configured to stall data flow of the first data D1 from the second processor 106 to the first processor 102. When the first data flow controller 212 receives the first identifier Id1 and the first enable signal ES1 is activated, the first data flow controller 212 is configured to generate the first control signal CS1, based on at least one of the ninth data count C9 and the first sampled count SC1, to control data flow of the first data D1 from the second processor 106 to the first processor 102. A deactivated state of the first control signal CS1 indicates that transmission of the first data D1 from the second processor 106 to the first processor 102 is in process. The activated state of the first control signal CS1 indicates the underrun event, i.e., the transmission of the first data D1 is completed and the first processor 102 is requesting additional data. Thus, when the first control signal CS1 is activated, the default data DFD is transmitted to the first processor 102.

The second identifier Id2, the tenth data count C10, the second enable signal ES2, and the second sampled count SC2 are received in conjunction. When the first data flow controller 212 receives the second identifier Id2 and the second enable signal ES2 is deactivated, the first data flow controller 212 is further configured to stall data flow of the second data D2 from the second processor 106 to the first processor 102. Further, when the first data flow controller 212 receives the second identifier Id2 and the second enable signal ES2 is activated, the first data flow controller 212 is configured to generate the first control signal CS1, based on at least one of the tenth data count C10 and the second sampled count SC2, to control data flow of the second data D2 from the second processor 106 to the first processor 102.

The first data flow controller 212 is further coupled with the first communication circuit 110, and further configured to provide the first control signal CS1 to the first communication circuit 110. The first data flow controller 212 is further configured to generate and provide the first address ready signal ARS1 and the read valid signal RVS associated with the first and second identifiers Id1 and Id2 to the first communication circuit 110. The first address ready signal ARS1 and the read valid signal RVS associated with the first identifier Id1 are activated (i.e., are at logic high states) when the first enable signal ES1 is activated. Similarly, the first address ready signal ARS1 and the read valid signal RVS associated with the second identifier Id2 are activated when the second enable signal ES2 is activated.

The third multiplexer 214 has a select terminal that is coupled with the first data flow controller 212, and configured to receive the first control signal CS1. For transmitting the first data D1 to the first processor 102, the third multiplexer 214 further has first and second input terminals that are configured to receive the first data D1 and the default data DFD (i.e., stream of binary bit '0'), respectively. The second memory 116 is coupled with the first input terminal of the third multiplexer 214, and further configured to provide the first data D1 to the first input terminal of the third multiplexer 214. In one embodiment, the second memory 116 is coupled with the second input terminal of the third multiplexer 214, and further configured to provide the default data DFD to the second input terminal of the third multiplexer 214. In another embodiment, the second input terminal of the third multiplexer 214 retrieves the default data DFD from a buffer memory (not shown) of the transmitter 118 that stores the default data DFD therein. Further, the third multiplexer 214 has an output terminal that is coupled with the first communication circuit 110, and configured to output and provide one of the first data D1 and the default data DFD as the read data RD based on the first control signal CS1 to the first communication circuit 110.

When the first control signal CS1 is deactivated (i.e., is at logic low state), the first data D1 is outputted and provided to the first communication circuit 110 as the read data RD. Further, when the first control signal CS1 is activated (i.e., is at logic high state), the default data DFD is outputted and provided to the first communication circuit 110 as the read data RD. The activated state of the first control signal CS1 is indicative of the underrun event, thus the default data DFD is provided as the read data RD to the first communication circuit 110. Similarly, for transmitting the second data D2 to the first processor 102, the first input terminal of the third multiplexer 214 receives the second data D2 from the second memory 116 and the output terminal of the third multiplexer 214 outputs and provides one of the second data D2 and the default data DFD as the read data RD based on the first control signal CS1 to the first communication circuit 110.

Figure 3:
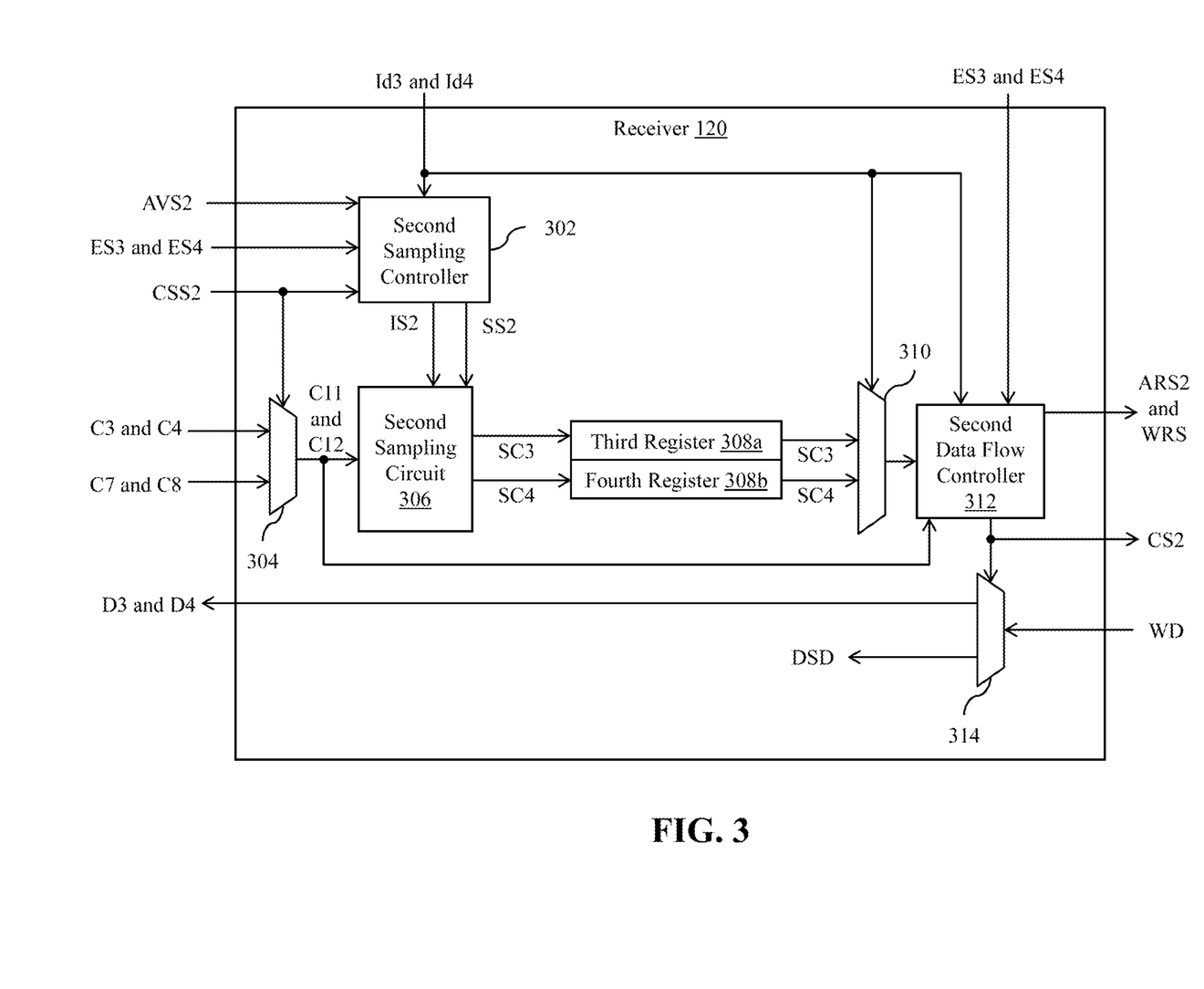
FIG. 3 is a block diagram of a receiver of the communication system of FIG. 1 in accordance with an embodiment of the present disclosure.

FIG. 3 is a block diagram of the receiver 120 in accordance with an embodiment of the present disclosure. The receiver 120 includes a second sampling controller 302, a fourth multiplexer 304, a second sampling circuit 306, third and fourth registers 308a and 308b, a fifth multiplexer 310, a second data flow controller 312, and a second demultiplexer 314.

The second sampling controller 302 is coupled with the second core 112, and configured to receive the third and fourth enable signals ES3 and ES4, the second address valid signal AVS2, and the second count select signal CSS2. The second sampling controller 302 is further coupled with the first communication circuit 110, and configured to receive the third and fourth identifiers Id3 and Id4 associated with the third and fourth data D3 and D4 that are to be received from the first communication circuit 110, respectively. The fourth data D4 is received from the first communication circuit 110 after the third data D3 is received from the first communication circuit 110. The third and fourth identifiers Id3 and Id4 are received by the second sampling controller 302 sequentially. In one embodiment, the second sampling controller 302 receives the third identifier Id3 before the fourth identifier Id4.

When the third identifier Id3 is received, the second sampling controller 302 is further configured to generate a second identification signal IS2 and a second sampling signal SS2 based on the third identifier Id3 and the third enable signal ES3. Further, the second sampling controller 302 generates the second identification signal IS2 and the second sampling signal SS2 when the second address valid signal AVS2 is activated (i.e., is at logic high state). Similarly, when the fourth identifier Id4 is received, the second sampling controller 302 generates the second identification signal IS2 and the second sampling signal SS2 based on the fourth identifier Id4 and the fourth enable signal ES4. In one embodiment, the second sampling signal SS2 is further generated based on the second count select signal CSS2. When the second count select signal CSS2 is activated (i.e., is at logic high state), the second sampling signal SS2 associated with the third identifier Id3 is generated after the third enable signal ES3 is activated, and the second sampling signal SS2 associated with the fourth identifier Id4 is generated after the fourth enable signal ES4 is activated. Further, when the second count select signal CSS2 is deactivated (i.e., is at logic low state), the second sampling signal SS2 associated with the third identifier Id3 is generated after the third enable signal ES3 and the second address valid signal AVS2 are activated, and the second sampling signal SS2 associated with the fourth identifier Id4 is generated after the fourth enable signal ES4 and the second address valid signal AVS2 are activated.

The fourth multiplexer 304 has a select terminal that is coupled with the second core 112, and configured to receive the second count select signal CSS2. The fourth multiplexer 304 further has first and second input terminals that are coupled with the second core 112 and the first communication circuit 110, respectively, and an output terminal that is coupled with the second sampling circuit 306. When the third identifier Id3 is received, the first and second input terminals of the fourth multiplexer 304 are configured to receive the seventh data count C7 and the third data count C3, respectively. Further, the output terminal of the fourth multiplexer 304 is configured to output and provide, based on the second count select signal CSS2, one of the seventh and third data counts C7 and C3 as an eleventh data count C11 to the second sampling circuit 306. The fourth multiplexer 304 outputs the third data count C3 when the second count select signal CSS2 is deactivated (i.e., is at logic low state), and the seventh data count C7 when the second count select signal CSS2 is activated (i.e., is at logic high state). Similarly, when the fourth identifier Id4 is received, the first and second input terminals of the fourth multiplexer 304 are configured to receive the eighth data count C8 and the fourth data count C4, respectively. Further, the output terminal of the fourth multiplexer 304 is configured to output and provide, based on the second count select signal CSS2, one of the eighth and fourth data counts C8 and C4 as a twelfth data count C12 to the second sampling circuit 306.

The second sampling circuit 306 is coupled with the second sampling controller 302, and configured to receive the second identification signal IS2 and the second sampling signal SS2 associated with the third and fourth identifiers Id3 and Id4. The second sampling circuit 306 is further coupled with the output terminal of the fourth multiplexer 304, and configured to receive the eleventh and twelfth data counts C11 and C12 associated with the third and fourth data D3 and D4, respectively. Further, the second sampling circuit 306 is configured to sample, based on the second identification signal IS2 and the second sampling signal SS2 associated with the third and fourth identifiers Id3 and Id4, the eleventh and twelfth data counts C11 and C12 to generate third and fourth sampled counts SC3 and SC4, respectively. The second sampling circuit 306 includes a third demultiplexer (not shown) and third and fourth switches (not shown).

The third demultiplexer has an input terminal that is coupled with the output terminal of the fourth multiplexer 304, and configured to receive one of the eleventh and twelfth data counts C11 and C12. The third demultiplexer further has a select terminal that is coupled with the second sampling controller 302, and configured to receive the second identification signal IS2. Further, the third demultiplexer has first and second output terminals that are coupled with the third and fourth switches. When the third identifier Id3 is received, the first output terminal of the third demultiplexer is further configured to output the eleventh data count C11 based on the second identification signal IS2 associated with the third identifier Id3. When the fourth identifier Id4 is received, the second output terminal of the third demultiplexer is further configured to output the twelfth data count C12 based on the second identification signal IS2 associated with the fourth identifier Id4.

The third and fourth switches are coupled with the second sampling controller 302, and configured to receive the second sampling signal SS2 associated with the third and fourth identifiers Id3 and Id4. Further, the third and fourth switches are coupled with the first and second output terminals of the third demultiplexer, and configured to receive and sample the eleventh and twelfth data counts C11 and C12 based on the second sampling signal SS2, respectively. The third and fourth switches sample the eleventh and twelfth data counts C11 and C12 to generate the third and fourth sampled counts SC3 and SC4, respectively. The third switch samples the eleventh data count C11 to generate the third sampled count SC3 when the second sampling signal SS2 associated with the third identifier Id3 is activated (i.e., logic high state). The second sampling signal SS2 associated with the third identifier Id3 is activated when the third enable signal ES3 is activated (i.e., is at logic high state). Similarly, the fourth switch samples the twelfth data count C12 to generate the fourth sampled count SC4 when the second sampling signal SS2 associated with the fourth identifier Id4 is activated (i.e., logic high state). The second sampling signal SS2 associated with the fourth identifier Id4 is activated when the fourth enable signal ES4 is activated (i.e., is at logic high state).

The third and fourth registers 308a and 308b are coupled with the second sampling circuit 306, and are configured to receive and store corresponding sampled counts. The third register 308a is coupled with the third switch of the second sampling circuit 306, and configured to receive and store the third sampled count SC3. The fourth register 308b is coupled with the fourth switch of the second sampling circuit 306, and configured to receive and store the fourth sampled count SC4.

It will be apparent to a person skilled in the art that although in the current embodiment, the receiver 120 includes the third and fourth registers 308a and 308b that store the third and fourth sampled counts SC3 and SC4 associated with the third and fourth data D3 and D4, respectively, the scope of the present disclosure is not limited to it. In an alternate embodiment, the receiver 120 may include more than two registers that store corresponding sampled counts associated with data to be received from the first processor 102.

The fifth multiplexer 310 has a select terminal that is coupled with the first communication circuit 110, and configured to receive one of the third and fourth identifiers Id3 and Id4. The fifth multiplexer 310 further has first and second input terminals that are coupled with the third and fourth registers 308a and 308b, and configured to receive the third and fourth sampled counts SC3 and SC4, respectively. Further, the fifth multiplexer 310 has an output terminal that is coupled with the second data flow controller 312, and configured to output and provide one of the third and fourth sampled counts SC3 and SC4 to the second data flow controller 312. When the select terminal of the fifth multiplexer 310 receives the third identifier Id3, the output terminal of the fifth multiplexer 310 outputs and provides the third sampled count SC3 to the second data flow controller 312. When the select terminal of the fifth multiplexer 310 receives the fourth identifier Id4, the output terminal of the fifth multiplexer 310 outputs and provides the fourth sampled count SC4 to the second data flow controller 312.

The second data flow controller 312 is coupled with the second sampling circuit 306 by way of the third and fourth registers 308a and 308b and the fifth multiplexer 310, and configured to receive one of the third and fourth sampled counts SC3 and SC4. The second data flow controller 312 is further coupled with the second core 112, the fourth multiplexer 304, and the first communication circuit 110, and further configured to receive the third and fourth enable signals ES3 and ES4, one of the eleventh and twelfth data counts C11 and C12, and the third and fourth identifiers Id3 and Id4, respectively.

The third identifier Id3, the eleventh data count C11, the third enable signal ES3, and the third sampled count SC3 are received in conjunction. When the second data flow controller 312 receives the third identifier Id3 and the third enable signal ES3 is deactivated, the second data flow controller 312 is further configured to stall the data flow of the third data D3 from the first processor 102 to the second processor 106. When the second data flow controller 312 receives the third identifier Id3 and the third enable signal ES3, the second data flow controller 312 is configured to generate the second control signal CS2, based on at least one of the eleventh data count C11 and the third sampled count SC3, to control data flow of the third data D3 from the first processor 102 to the second processor 106. A deactivated state of the second control signal CS2 indicates that reception of the third data D3 by the second processor 106 from the first processor 102 is in progress. The activated state of the second control signal CS2 indicates the overrun event, i.e., the reception of the third data D3 is completed and the first processor 102 is providing additional data to the second processor 106. Thus, when the second control signal CS2 is activated, additional data received by the second processor 106 is discarded.

The fourth identifier Id4, the twelfth data count C12, the fourth enable signal ES4, and the fourth sampled count SC4 are received in conjunction. When the second data flow controller 312 receives the fourth identifier Id4 and the fourth enable signal ES4 is deactivated, the second data flow controller 312 is further configured to stall the data flow of the fourth data D4 from the first processor 102 to the second processor 106. Further, when the second data flow controller 312 receives the fourth identifier Id4 and the fourth enable signal ES4 is activated, the second data flow controller 312 is configured to generate the second control signal CS2, based on at least one of the twelfth data count C12 and the fourth sampled count SC4, to control data flow of the fourth data D4 from the first processor 102 to the second processor 106.

The second data flow controller 312 is further coupled with the first communication circuit 110, and further configured to provide the second control signal CS2 to the first communication circuit 110. The second data flow controller 312 is further configured to generate and provide the second address ready signal ARS2 and the write ready signal WRS associated with the third and fourth identifiers Id3 and Id4 to the first communication circuit 110. The second address ready signal ARS2 and the write ready signal WRS associated with the third identifier Id3 are activated (i.e., are at logic high states) when the third enable signal ES3 is activated. The second address ready signal ARS2 and the write ready signal WRS associated with the fourth identifier Id4 are activated (i.e., are at logic high states) when the fourth enable signal ES4 are is activated.

The second demultiplexer 314 has a select terminal that is coupled with the second data flow controller 312, and configured to receive the second control signal CS2. For receiving the third data D3 from the first processor 102, the second demultiplexer 314 further has an input terminal that is configured to receive the write data WD. Further, the second demultiplexer 314 has first and second output terminals that are configured to output the write data WD as one of the third data D3 and discarded data DSD based on the second control signal CS2.

When the second control signal CS2 is deactivated (i.e., generated at logic low state), the write data WD is received as the third data D3 from the first communication circuit 110. The third data D3 is stored in the second memory 116. Further, when the second control signal CS2 is activated (i.e., generated at logic high state), the write data WD is received as the discarded data DSD from the first communication circuit 110. The activated state of the second control signal CS2 is indicative of the overflow event, thus the write data WD is received as the discarded data DSD from the first communication circuit 110 and is not stored in the second memory 116. Similarly, for receiving the fourth data D4 from the first processor 102, the input terminal of the second demultiplexer 314 receives the write data WD and the first and second output terminals of the second demultiplexer 314 output and provide the write data WD as the fourth data D4 and the discarded data DSD based on the second control signal CS2. Further, the fourth data D4 is stored in the second memory 116.

The first and second data flow controllers 212 and 312 provide the first and second control signals CS1 and CS2 to the first processor 102, respectively. The first processor 102 thus receives an indication for the underrun or overrun event and hence data loss is avoided. The generation of first and second control signals CS1 and CS2 based on identifiers (such as first and third identifiers Id1 and Id3, respectively) and enable signals (such as the first and third enable signal ES1 and ES3, respectively) ensures that the data flow between the first and second processors 102 and 106 is synchronized. Thus, the utilization of the first and second control signals CS1 and CS2 to control the data flow eliminates a need for an acknowledgement that indicates a completion of the data transfer between the first and second processors 102 and 106 as well as a need for the first processor 102 to wait for the acknowledgement. As a result, the first and second processors 102 and 106 are enabled to operate independently, and a time taken for the data transfer between the first and second processors 102 and 106 in the communication system 100 of the present disclosure is significantly less as compared to that in a conventional communication system that utilizes additional instructions to synchronize the data transfer. Further, as the first and second processors 102 and 106 are able to operate independently and the time required for the data transfer is significantly reduced, an efficiency of the communication system 100 is significantly higher than that of the conventional communication system.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A first processor in communication with a second processor, the first processor comprising:
   a sampling controller that is configured to: (i) receive, from the second processor, a first identifier associated with first data that is to be transmitted to the second processor, (ii) receive a first enable signal associated with the first data, and (iii) generate an identification signal and a sampling signal based on the first identifier and the first enable signal;
   a sampling circuit that is coupled with the sampling controller, and configured to receive the identification signal, the sampling signal, and a first data count associated with the first data, and sample, based on the identification signal and the sampling signal, the first data count to generate a first sampled count; and
   a data flow controller that is coupled with the sampling circuit, and configured to receive the first identifier, the first data count, the first enable signal, and the first sampled count, and generate a control signal to control data flow of the first data from the first processor to the second processor.

2. The first processor of claim 1, further comprising a first multiplexer that has:
   a select terminal coupled with the data flow controller, and configured to receive the control signal;
   first and second input terminals configured to receive the first data and default data, respectively; and
   an output terminal coupled with the second processor, and configured to output and provide, based on the control signal, one of the first data and default data as read data to the second processor, wherein when the control signal is deactivated, the first data is outputted and provided to the second processor as the read data, and when the control signal is activated, the default data is outputted and provided to the second processor as the read data, wherein an activated state of the control signal is indicative of an underrun event, and wherein the data flow controller is further coupled with the second processor, and further configured to provide the control signal to the second processor.

3. The first processor of claim 2, further comprising a memory that is configured to store the first data, wherein the memory is coupled with the first input terminal of the first multiplexer, and further configured to provide the first data to the first input terminal of the first multiplexer.

4. The first processor of claim 1, wherein when the data flow controller receives the first identifier and the first enable signal is deactivated, the data flow controller is further configured to stall the data flow of the first data from the first processor to the second processor.

5. The first processor of claim 1, further comprising a core that is coupled with the second processor, and configured to receive configuration information associated with the first data and generate a count select signal and the first enable signal, wherein the first enable signal is activated when the configuration information associated with the first data is received, and deactivated when the first data is transmitted to the second processor, and wherein the configuration information includes at least a length of the first data and a second data count associated with the first data.

6. The first processor of claim 5, further comprising a second multiplexer that has:
a select terminal coupled with the core, and configured to receive the count select signal;
first and second input terminals coupled with the core and the second processor, and configured to receive the second data count and a third data count associated with the first data, respectively; and
an output terminal coupled with the sampling circuit, and configured to output and provide, based on the count select signal, one of the second and third data counts as the first data count to the sampling circuit.

7. The first processor of claim 1, further comprising a first register that is coupled with the sampling circuit, and configured to receive and store the first sampled count.

8. The first processor of claim 7, wherein:
the sampling controller is further configured to: (i) receive, from the second processor after the first identifier is received, a second identifier associated with second data that is to be transmitted to the second processor after the first data is transmitted, and (ii) receive a second enable signal associated with the second data,
the sampling controller generates the identification signal and the sampling signal based on the second identifier and the second enable signal,
the sampling circuit is further configured to receive a fourth data count associated with the second data, and sample, based on the identification signal and the sampling signal, the fourth data count to generate a second sampled count,
the data flow controller is further configured to receive the second identifier, the fourth data count, the second enable signal, and the second sampled count,
the data flow controller generates the control signal to control data flow of the second data from the first processor to the second processor based on the second identifier, the fourth data count, the second enable signal, and the second sampled count, and
when the data flow controller receives the second identifier and the second enable signal is deactivated, the data flow controller is further configured to stall the data flow of the second data from the first processor to the second processor.

9. The first processor of claim 8, further comprising:
a second register that is coupled with the sampling circuit, and configured to receive and store the second sampled count; and
a third multiplexer that has:
a select terminal coupled with the second processor, and configured to receive one of the first and second identifiers;
first and second input terminals coupled with the first and second registers, and configured to receive the first and second sampled counts, respectively; and
an output terminal coupled with the data flow controller, and configured to output and provide one of the first and second sampled counts to the data flow controller, wherein when the select terminal of the third multiplexer receives the first identifier, the output terminal of the third multiplexer outputs and provides the first sampled count to the data flow controller, and when the select terminal of the third multiplexer receives the second identifier, the output terminal of the third multiplexer outputs and provides the second sampled count to the data flow controller.

10. A first processor in communication with a second processor, the first processor comprising:
a sampling controller that is configured to: (i) receive, from the second processor, a first identifier associated with first data that is to be received from the second processor, (ii) receive a first enable signal associated with the first data, and (iii) generate an identification signal and a sampling signal based on the first identifier and the first enable signal;
a sampling circuit that is coupled with the sampling controller, and configured to receive the identification signal, the sampling signal, and a first data count associated with the first data, and sample, based on the identification signal and the sampling signal, the first data count to generate a first sampled count; and
a data flow controller that is coupled with the sampling circuit, and configured to receive the first identifier, the first data count, the first enable signal, and the first sampled count, and generate a control signal to control data flow of the first data from the second processor to the first processor.

11. The first processor of claim 10, further comprising a demultiplexer that has:
a select terminal coupled with the data flow controller, and configured to receive the control signal;
an input terminal coupled with the second processor, and configured to receive write data; and
first and second output terminals configured to output, based on the control signal, the write data as one of the first data and discarded data, respectively, wherein when the control signal is deactivated, the write data is outputted as the first data, and when the control signal is activated, the write data is outputted as the discarded data, wherein an activated state of the control signal is indicative of an overrun event, and wherein the data flow controller is further coupled with the second processor, and further configured to provide the control signal to the second processor.

12. The first processor of claim 11, further comprising a memory that is coupled with the first output terminal of the demultiplexer, and configured to receive and store the first data.

13. The first processor of claim 10, wherein when the data flow controller receives the first identifier and the first enable signal is deactivated, the data flow controller is further configured to stall data flow of the first data from the second processor to the first processor.

14. The first processor of claim 10, further comprising a core that is coupled with the second processor, and configured to receive configuration information associated with the first data and generate a count select signal and the first enable signal, wherein the first enable signal is activated when the configuration information associated with the first data is received, and deactivated when the first data is received from the second processor, and wherein the configuration information includes at least a length of the first data and a second data count associated with the first data.

15. The first processor of claim 14, further comprising a first multiplexer that has:
a select terminal coupled with the core, and configured to receive the count select signal;
first and second input terminals coupled with the core and the second processor, and configured to receive the second data count and a third data count associated with the first data, respectively; and an output terminal coupled with the sampling circuit, and configured to output and provide, based on the count select signal, one of the second and third data counts as the first data count to the sampling circuit.

16. The first processor of claim 10, further comprising a first register that is coupled with the sampling circuit, and configured to receive and store the first sampled count.

17. The first processor of claim 16, wherein:
the sampling controller is further configured to: (i) receive, from the second processor after the first identifier is received, a second identifier associated with second data that is to be received from the second processor after the first data is received, and (ii) receive a second enable signal associated with the second data,
the sampling controller generates the identification signal and the sampling signal based on the second identifier and the second enable signal,
the sampling circuit is further configured to receive a fourth data count associated with the second data, and sample, based on the identification signal and the sampling signal, the fourth data count to generate a second sampled count,
the data flow controller is further configured to receive the second identifier, the fourth data count, the second enable signal, and the second sampled count,
the data flow controller generates the control signal to control data flow of the second data from the second processor to the first processor based on the second identifier, the fourth data count, the second enable signal, and the second sampled count, and
when the data flow controller receives the second identifier and the second enable signal is deactivated, the data flow controller is further configured to stall data flow of the second data from the second processor to the first processor.

18. The first processor of claim 17, further comprising:
a second register that is coupled with the sampling circuit, and configured to receive and store the second sampled count; and
a second multiplexer that has:
   a select terminal coupled with the second processor, and configured to receive one of the first and second identifiers;
   first and second input terminals coupled with the first and second registers, and configured to receive the first and second sampled counts, respectively; and
   an output terminal coupled with the data flow controller, and configured to output and provide one of the first and second sampled counts to the data flow controller, wherein when the select terminal of the second multiplexer receives the first identifier, the output terminal of the second multiplexer outputs and provides the first sampled count to the data flow controller, and when the select terminal of the second multiplexer receives the second identifier, the output terminal of the second multiplexer outputs and provides the second sampled count to the data flow controller.

19. A first processor in communication with a second processor, the first processor comprising:
a transmitter comprising:
   a first sampling controller that is configured to: (i) receive, from the second processor, a first identifier associated with first data that is to be transmitted to the second processor, (ii) receive a first enable signal associated with the first data, and (iii) generate a first identification signal and a first sampling signal based on the first identifier and the first enable signal;
   a first sampling circuit that is coupled with the first sampling controller, and configured to receive the first identification signal, the first sampling signal, and a first data count associated with the first data, and sample, based on the first identification signal and the first sampling signal, the first data count to generate a first sampled count; and
   a first data flow controller that is coupled with the first sampling circuit, and configured to receive the first identifier, the first data count, the first enable signal, and the first sampled count, and generate a first control signal to control data flow of the first data from the first processor to the second processor; and
a receiver comprising:
   a second sampling controller that is configured to: (i) receive, from the second processor, a second identifier associated with second data that is to be received from the second processor, (ii) receive a second enable signal associated with the first data, and (iii) generate a second identification signal and a second sampling signal based on the second identifier and the second enable signal;
   a second sampling circuit that is coupled with the second sampling controller, and configured to receive the second identification signal, the second sampling signal, and a second data count associated with the second data, and sample, based on the second identification signal and the second sampling signal, the second data count to generate a second sampled count; and
   a second data flow controller that is coupled with the second sampling circuit, and configured to receive the second identifier, the second data count, the second enable signal, and the second sampled count, and generate a second control signal to control data flow of the second data from the second processor to the first processor.

20. The first processor of claim 19, further comprising a core that is coupled with the second processor, and configured to receive first and second configuration information associated with the first and second data, respectively, and generate the first and second enable signals, respectively, wherein the first enable signal is activated when the first configuration information associated with the first data is received, and deactivated when the first data is transmitted to the second processor, and wherein the second enable signal is activated when the second configuration information associated with the second data is received, and deactivated when the second data is received from the second processor.

* * * * *